United States Patent [19]

Rhodes, Jr.

[11] Patent Number: 5,116,079

[45] Date of Patent: May 26, 1992

[54] INSTRUMENT PANEL AIR BAG COVER DOOR

[75] Inventor: Richard D. Rhodes, Jr., Somersworth, N.H.

[73] Assignee: Davidson Textron Inc., Dover, N.H.

[21] Appl. No.: 622,952

[22] Filed: Dec. 6, 1990

[51] Int. Cl.$^5$ ............................................. B60R 21/16
[52] U.S. Cl. .................................................. 280/732
[58] Field of Search ............... 280/728, 732, 731, 743, 280/752

[56] References Cited

U.S. PATENT DOCUMENTS

| | | | |
|---|---|---|---|
| 3,640,546 | 2/1972 | Brawn | 280/732 |
| 3,794,349 | 2/1974 | Fuller | 280/732 |
| 4,773,673 | 9/1988 | Sakurai | 280/732 |
| 4,925,209 | 5/1990 | Sakurai | 280/732 |
| 4,968,057 | 11/1990 | Rafferty | 280/732 |

FOREIGN PATENT DOCUMENTS

| | | | |
|---|---|---|---|
| 2425659 | 12/1975 | Fed. Rep. of Germany | 280/732 |
| 1954398 | 10/1977 | Fed. Rep. of Germany | 280/728 |

*Primary Examiner*—Charles A. Marmor
*Assistant Examiner*—Tamara L. Graysay
*Attorney, Agent, or Firm*—Reising, Ethington, Barnard, Perry & Milton

[57] ABSTRACT

A vehicle dash board comprises a support mounting a storage compartment for an inflatable air bag, a resilient covering for the dash board, and an opening in the support for enabling deployment of the air bag upon inflation outwardly of the dash board. A decorative panel carried by the support and concealing the storage compartment comprises a backing plate having a U-shaped cut line framing the opening and defining a door. A rod is carried by the support and engages the backing plate along a line connecting the ends of the cut line at the top of the U to provide a hinge line for the door. A resilient layer of material overlies the backing plate and comprises an outer flexible skin layer and an intermediate resilient foam layer bonded to the support and skin. The skin layer has an end flap on its free side opposite the hinge line which is stitched to the adjacent dash board covering so as to define a tamper proof door seam which cannot be pried open either by intention or inadvertance. Inflation of the air bag forces the door open by tearing the stitching to free the door which bends about the rod to enable deployment of the air bag outwardly of the panel.

12 Claims, 2 Drawing Sheets

INSTRUMENT PANEL AIR BAG COVER DOOR

FIELD OF THE INVENTION

This invention relates generally to decorative panels covering air bag storage compartments in passenger vehicles and, more particularly, to a deployment door formed in such a panel covering the storage compartment.

BACKGROUND OF THE INVENTION

An increasing number of passenger vehicles manufactured today are equipped with supplemental inflatable restraints for vehicle occupants; these are commonly known as air bags. The air bag for the front seat passenger is normally located in a storage compartment mounted in the vehicle dash board.

The dash board normally comprises a metal support structure covered by decorative panel comprising a rigid metal or plastic backing plate on which is mounted a resilient foam pad having a flexible plastic outer skin covering. The dash board support mounts the air bag storage compartment and incorporates a door formed in the decorative panel to cover this storage compartment. This door is normally rectangular and is mounted in an opening in the surrounding panel area so that it can be swung open by the deploying air bag upon inflation.

Alternatively, the air bag door can comprise an integral portion of the foam and skin layers that is ripped open by a cutter mounted on the door backing plate upon air bag inflation. In another arrangement, the skin includes a tear seam line of weakened panel material along three sides of the door. This tear seam is fractured by the inflating air bag so that the door swings open about its fourth side, which functions as a hinge, to enable the air bag to properly deploy.

It is essential that the door pivot out of the way of the deploying air bag and remain attached to the dash board upon opening. If the door should separate from the dash board under the explosive force of the deploying air bag, it would become a dangerous missile. If the door does not reliably pivot out of the way of the deploying air bag, it could affect air bag deployment and effectiveness.

Many different arrangements have been utilized in an attempt to assure that the door does indeed pivot out of the way upon opening, while maintaining the door attached to the panel.

One such arrangement is shown in U.S. Pat. No. 4,925,209 to Sakurai in which the metal door support is doubled over and bolted to the dash board structure at spaced intervals. In case the doubled door metal should fail, a loop is formed in the doubled metal fold and a rod is placed therein to physically engage the bolts to prevent door separation.

Other arrangements form the door from an integral flap of the dash board metal support structure. Yet others provide tethers to prevent separation.

It is desirable for the door to hinge open about a predictable hinge line and to open completely while remaining attached to the dash board, so that it not restrict or otherwise affect deployment of the air bag.

It is also desirable to attach the door to the surrounding dash board so that it will tear about a predictable tear seam line upon air bag inflation.

SUMMARY OF THE INVENTION

Accordingly, it is an object of this invention to provide an air bag cover door that is mounted for pivoting movement about a fixed hinge line upon opening.

It is another object to provide an air bag cover door having its free edges attached to the surrounding dash board so that it will reliably separate about a predictable tear line upon opening and move out of the way of the deploying air bag.

In accordance with one aspect of this invention, a vehicle passenger compartment has a dash board comprising a support mounting a storage compartment for an inflatable air bag, a resilient covering for the dash board, an opening in the support for enabling deployment of the air bag upon inflation outwardly of the dash board, and a decorative panel carried by the support and concealing the storage compartment. The panel comprises a backing plate having a U-shaped cut line framing the opening and defining a door, a rod carried by the support and engaging the backing plate along a line connecting the ends of the cut line at the top of the U to provide a hinge line for the door, and a resilient layer of material overlying the backing plate. Inflation of the air bag will force the door open by bending the backing plate about the rod to enable deployment of the air bag outwardly of the panel.

In accordance with another aspect of this invention, a vehicle passenger compartment has a dash board comprising a support mounting a storage compartment for an inflatable air bag, a resilient covering for the dash board, an opening in the support for enabling deployment of the air bag upon inflation outwardly of the dash board, and a decorative panel carried by the support and concealing the storage compartment. The panel comprises a backing plate covering the opening and defining a door having one edge attached to the support to define a hinge line, a resilient door covering overlying the backing plate, a flap on the door covering opposite the hinge line, and frangible means defining a tear seam attaching the flap to the adjacent dash board covering. Inflation of the air bag will fracture the tear seam and force the door open about the hinge line to enable deployment of the air bag outwardly of the panel.

A better understanding of the invention can be obtained by reference to the following detailed description, taken in conjunction with the accompanying illustrative drawings, wherein:

DRAWING DESCRIPTION

DETAILED DESCRIPTION OF THE INVENTION

Figure 1:
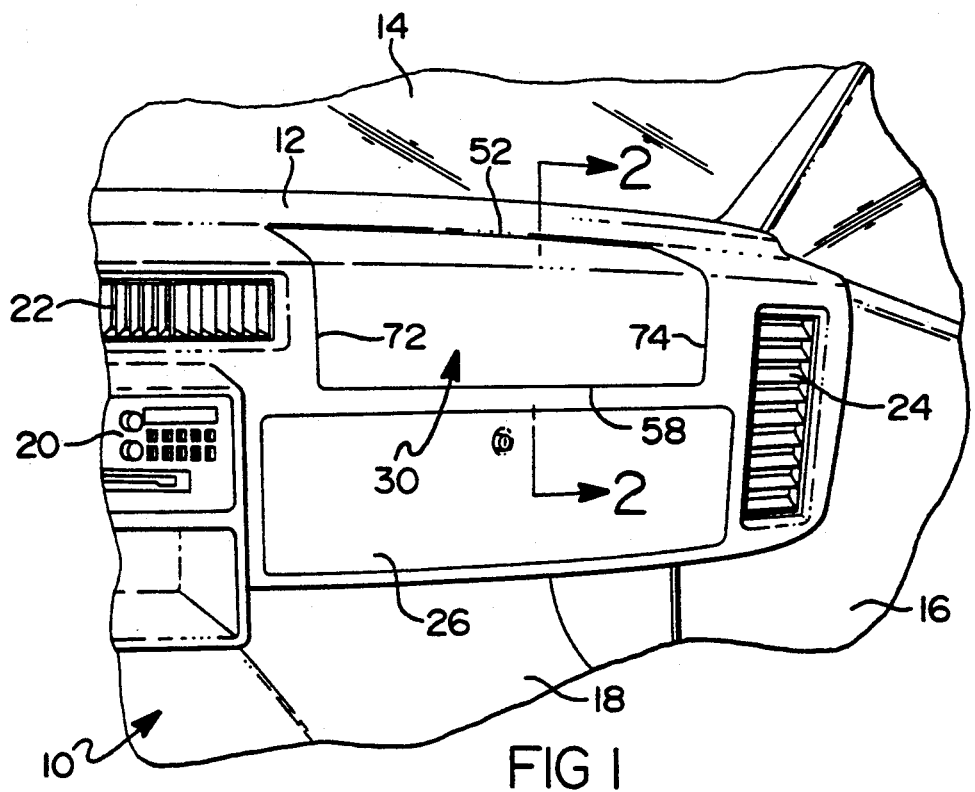
FIG. 1 is a perspective view of a portion of a vehicle passenger compartment having a decorative panel having a door concealing an inflatable air bag formed in accordance with this invention.

Referring now to FIG. 1 of the drawings, a conventional passenger vehicle has an interior passenger compartment, generally designated 10, that includes a dash board 12 bounded by a windshield 14, a passenger door 16 and a floor board 18. Dash board 12 mounts the usual sound system control unit 20, air distribution vent units 22, 24, and the usual storage compartment known as a glove box (not shown) closed by a glove box door 26.

Figure 2:
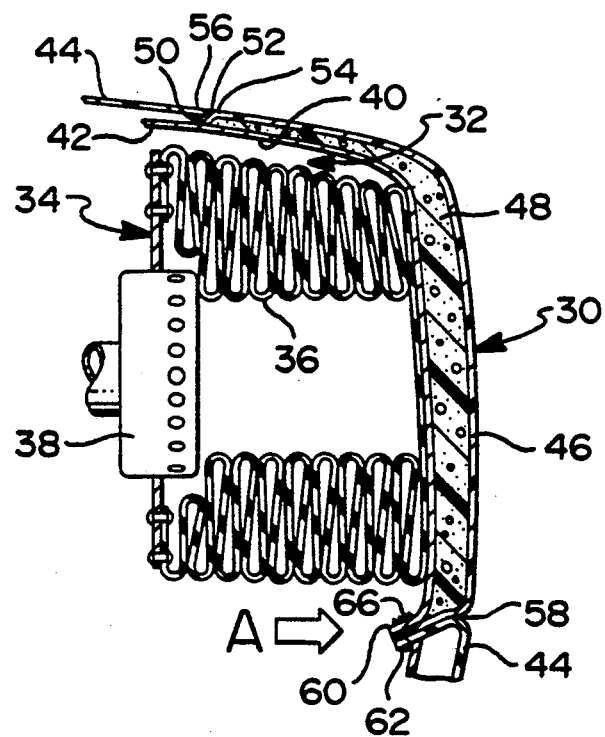
FIG. 2 is a sectional view of one embodiment of the panel shown in FIG. 1, taken along line 2—2 of FIG. 1, showing the stored air bag concealed by the cover door.

Mounted above the glove box door 26 is a decorative panel including a door 30 which covers and conceals a storage compartment 32 for an inflatable passenger restraint, or air bag, assembly 34, as shown in FIG. 2. The air bag assembly 34 forms no part of this invention and comprises an inflatable bag 36 and an inflating mechanism 38 of any conventional design. In FIG. 2, the bag 36 is shown in its collapsed, deflated condition located fully within storage compartment 32.

Door 30 completely frames and covers storage compartment 32 and is of composite construction. A rigid metal backing plate 40 which can comprise a integral portion of a dash board support plate 42 formed by cutting a U-shaped cut in support plate 42. Support plate 40 underlies the flexible upper outer surface or skin 44 of dash board 12. Door 30 has an outer skin layer 46 of the same material, preferably vinyl, as the dash board skin 44.

Interposed between the inner support plate 40 and the outer skin 46 is an intermediate layer of resilient foam 48, such as formed from an expanded polyurethane resin. The composite door 30 is preferably formed by placing the backing plate 40 and skin 46 in a mold and foaming the foam layer in situ to bond the foam to both the inner backing plate 40 and the outer skin 46 to form the composite door 30. Of course, foam layer, 48 may comprise a discrete element adhesively attached to support plate 40 and outer skin 46.

A transverse metal rod 50 is mounted on the dash board support plate 42 at its transition to backing plate 40. This defines a hinge line upon which the door 30 will open, as will be later described. Rod 50 is located at the seam 52 formed by the upper edge 54 of door skin 46 which abuts and folds under lateral edge 56 of dash board skin 44. Of course, the seam 52 could be eliminated by making the door 30 integral with dash board 12 at this juncture.

Figure 4:
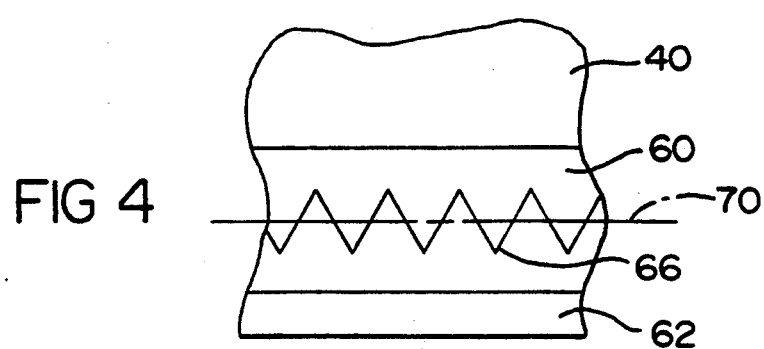
FIG. 4 is an enlarged detail view of a portion of the stitched tear seam shown in FIG. 2, looking in the direction indicated by the arrow A.

The lower edge of door skin 46 carries a depending flap 62 which abuts and folds under the adjacent edge of the dash board skin to form a seam 58. Flap 60 continues inwardly past the bottom edge of backing plate 40 to lie adjacent an inwardly extending flap 62 carried by dash board skin 44. As shown in FIG. 4, the flaps 60 and 62 are sewn together with conventional stitching 66. This line of stitching forms a frangible tear seam line 70, the function of which will be described later. The side seams 72, 74 may comprise abutting edges of the adjacent skin layers, as with seam 52, or may comprise a stitched seam, as with seam 58.

Operation of the invention will now be described with reference to Figs. 2, 3 and 4. Upon a predetermined impact of the vehicle, inflating mechanism 38 suddenly inflates bag 36. The force of inflation exerts a substantial outward pressure on door 30. The resultant force on door 30 fractures, or rips, stitching 66 along the tear line 70 which frees the bottom of door 30. Since the upper edge of backing plate 40 is attached to the dash board support, being integral with it, door 30 will pivot upwardly, with backing plate 40 bending about rod 50 which acts as a fulcrum.

Figure 3:
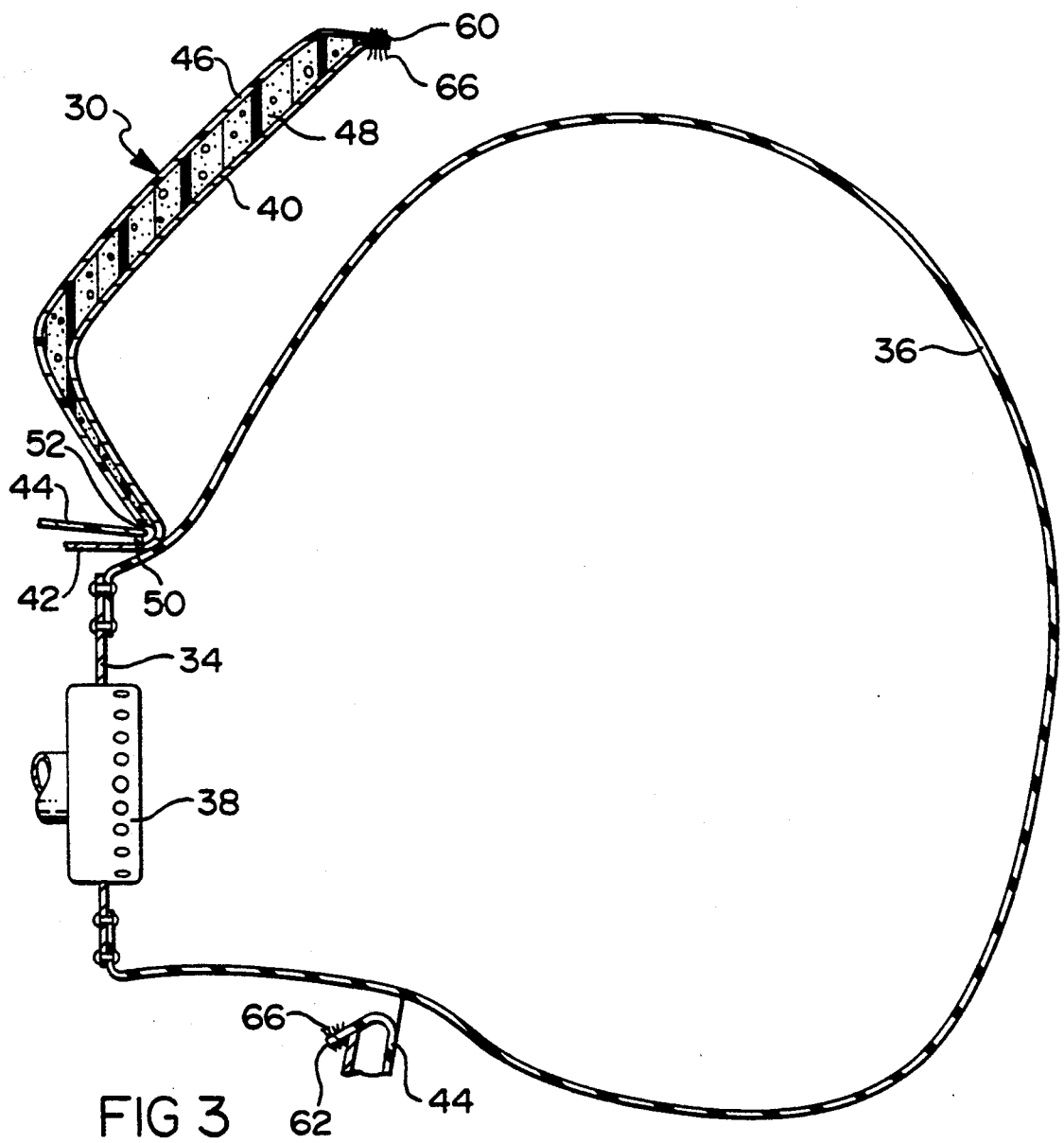
FIG. 3 is a view similar to FIG. 2, but showing the door opened and the air bag deployed.

As a result, door 30 pivots about the hinge line established by rod 50 as air bag 36 moves from its stored FIG. 2 position to its inflated position of FIG. 3, where it is deployed outwardly of dash board 12 into passenger compartment 10. As shown in FIG. 3, door 30 remains attached to the dash board 12, although it has moved completely out of the way of inflating bag 36 to permit its unobstructed deployment.

As noted above, the side seams 72, 74 could also comprise stitched flaps. In this case, inflation of air bag 36 would rip these seams along similar tear seam lines to free door 30 for opening. Of course, rod 50 is merely exemplary of a means for providing a fulcrum for door 30 to pivot about when opening.

Thus this invention provides an air bag cover door that is mounted for pivoting movement about a fixed hinge line upon opening and provides an air bag cover door having its free edges attached to the surrounding dash board so that will reliably separate about a predictable tear line upon opening and move out of the way of the deploying air bag while remaining tamper proof against attempts to pry open the door.

I claim:

1. In a vehicle passenger compartment having a dash board comprising a support mounting a storage compartment for inflatable air bag, a resilient covering for the dash board, and an opening in the support for enabling deployment of the air bag upon inflation outwardly of the dash board, a decorative panel carried by the support and concealing the storage compartment characterized by:

a backing plate integrally formed with the support and having a U-shaped cut line having two ends at a top of the U-shaped cut line, said cut line framing the opening and defining a door;

a rod carried by the support and engaging the backing plate along a line connecting the ends of the cut line at the top of the U-shaped cut line to provide a hinge line for the door;

a resilient layer of material overlying the backing plate;

whereby inflation of the air bag will force the door open by bending the backing plate about the rod to enable deployment of the air bag outwardly of the panel.

2. The decorative panel of claim 1, further characterized by said backing plate having an outer side and the rod being mounted to engage the backing plate on its outer side.

3. The panel of claim 1, further characterized by the resilient door covering comprising an outer flexible skin layer and an intermediate resilient foam layer bonded to the support and skin, the skin layer including an end flap on its free side opposite the hinge line and frangible means defining a tear seam attaching the flap to the adjacent dash board covering, the tear seam being fractured by the force of the expanding air bag upon inflation thereof to permit the door to open about the hinge line and enable deployment of the air bag.

4. The panel of claim 3, further characterized by the frangible means comprising stitching.

5. The panel of claim 3, further characterized by the skin layer includes side flaps between the hinge line and the end flap and frangible means defining tear seams attaching the side flaps to the adjacent dash board covering.

6. The panel of claim 5, further characterized by the frangible means comprising stitching.

7. The panel of claim 1 further characterized by the resilient door covering comprising an outer flexible skin layer and an intermediate resilient foam layer bonded to the support and skin, the skin layer having edges adjacent the dash board covering, and frangible means defining a tear seam attaching the skin layer to the adjacent dash board covering, the tear seam being fractured by the force of the expanding air bag upon inflation thereof to permit the door to open about the hinge line and enable deployment of the air bag.

8. In a vehicle passenger compartment having a dash board comprising a support mounting a storage compartment for an inflatable air bag, a resilient covering for the dash board, and an opening in the support for enabling deployment of the air bag upon inflation outwardly of the dash board, a decorative panel carried by the support and concealing the storage compartment characterized by:

a backing plate covering the opening and defining a door having one edge integrally formed and attached to the support to define a hinge line, a resilient door covering overlying the backing plate, a flap on the door covering opposite the hinge line, and frangible means defining a tear seam attaching the flap to the adjacent dash board covering, whereby inflation of the air bag will fracture the tear seam and force the door open about the hinge line to enable deployment of the air bag outwardly of the panel.

9. The panel of claim 8, further characterized by the resilient door covering comprising an outer flexible skin layer and an intermediate resilient foam layer bonded to the support and skin, the skin layer including the end flap.

10. The panel of claim 8, further characterized by the frangible means comprising stitching.

11. The panel of claim 10, further characterized by the door covering including side flaps between the hinge line and the end flap and frangible means defining tear seams attaching the side flaps to the adjacent dash board covering.

12. The panel of claim 11, further characterized by the frangible means comprising stitching.

* * * * *